US008960349B2

(12) United States Patent
Sherlock

(10) Patent No.: US 8,960,349 B2
(45) Date of Patent: Feb. 24, 2015

(54) HYDRAULIC FLUID WARM-UP USING HYDRAULIC FAN REVERSAL

(71) Applicant: Deere & Company, Moline, IL (US)

(72) Inventor: Lance Robert Sherlock, Asbury, IA (US)

(73) Assignee: Deere & Company, Moline, IL (US)

( * ) Notice: Subject to any disclaimer, the term of this patent is extended or adjusted under 35 U.S.C. 154(b) by 39 days.

(21) Appl. No.: 13/863,826

(22) Filed: Apr. 16, 2013

(65) Prior Publication Data

US 2014/0305723 A1 Oct. 16, 2014

(51) Int. Cl.

| | |
|---|---|
| ***B60K 11/04*** | (2006.01) |
| ***F01P 11/10*** | (2006.01) |
| ***B66C 13/22*** | (2006.01) |
| ***E02F 9/20*** | (2006.01) |
| ***F15B 21/04*** | (2006.01) |

(52) U.S. Cl.

CPC ................. *F01P 11/10* (2013.01); *B66C 13/22* (2013.01); *E02F 9/2095* (2013.01); *F15B 21/042* (2013.01)

USPC ..................... 180/68.4; 123/41.12; 123/41.51

(58) Field of Classification Search

USPC .................... 180/68.1, 68.2, 68.3, 68.4, 68.5; 123/41.12, 41.48, 41.49, 41.51

See application file for complete search history.

(56) References Cited

U.S. PATENT DOCUMENTS

| | | | | |
|---|---|---|---|---|
| 6,076,488 | A | 6/2000 | Yamagishi | |
| 6,126,079 | A | 10/2000 | Shoemaker | |
| 6,349,882 | B1 | 2/2002 | Kita et al. | |
| 6,750,623 | B1 * | 6/2004 | McCauley et al. | 318/260 |
| 6,959,671 | B2 * | 11/2005 | Nakagawa et al. | 123/41.49 |
| 7,066,114 | B1 | 6/2006 | Hannesen et al. | |
| 7,459,870 | B2 | 12/2008 | Beck et al. | |
| 2008/0108032 | A1 | 5/2008 | Tuhy et al. | |
| 2012/0304944 | A1 | 12/2012 | Nelson et al. | |

OTHER PUBLICATIONS

Flexxaire Brochure, available online at http://www.flexxaire.com/resources.htm, Mar. 1, 2010, 4 pages.

* cited by examiner

*Primary Examiner* — John Walters

(74) *Attorney, Agent, or Firm* — Faegre Baker Daniels LLP

(57) ABSTRACT

A work vehicle is disclosed including at least one hydraulic actuator that receives hydraulic fluid, and a cooling system that promotes improved warm-up of the hydraulic fluid by directing air from an engine compartment across the hydraulic fluid in a reverse direction to warm the hydraulic fluid.

23 Claims, 4 Drawing Sheets

HYDRAULIC FLUID WARM-UP USING HYDRAULIC FAN REVERSAL

FIELD

The present disclosure relates to a hydraulic system of a work vehicle. More particularly, the present disclosure relates to a hydraulic system that promotes improved warm-up of hydraulic fluid in a work vehicle using hydraulic fan reversal, and to a method for using the same.

BACKGROUND

During the initial start-up and operation of a work vehicle, hydraulic fluid in the work vehicle may be relatively cold, especially when the work vehicle is operating in a cold climate. The cold hydraulic fluid may be viscous, which may reduce the response of hydraulic functions of the work vehicle, reduce hydraulic efficiency due to higher pressure drops in the work vehicle, and cause problems with power control of the work vehicle, for example. When the cold hydraulic fluid eventually warms up to a normal operating temperature and becomes less viscous, the work vehicle may function and react properly. However, the warm up period may require a significant period of time, such as an hour or more.

SUMMARY

The present disclosure provides a work vehicle including at least one hydraulic actuator that receives hydraulic fluid, and a cooling system that promotes improved warm-up of the hydraulic fluid by directing air from an engine compartment across the hydraulic fluid in a reverse direction to warm the hydraulic fluid.

According to an embodiment of the present disclosure, a work vehicle is provided including a work vehicle is provided including a chassis that defines an engine compartment, at least one traction device supporting the chassis on the ground, an engine located in the engine compartment of the chassis, the engine operably coupled to the at least one traction device to propel the chassis across the ground, at least one hydraulic actuator that receives hydraulic fluid, and a cooling system. The cooling system includes a hydraulic cooler in fluid communication with the at least one hydraulic actuator to receive the hydraulic fluid, a fan having a first mode of operation, wherein the fan directs air across the hydraulic cooler in a first direction, and a second mode of operation, wherein the fan directs air from the engine compartment across the hydraulic cooler in a second direction opposite the first direction, and a controller that operates the fan in the second mode of operation when the hydraulic fluid is below a predetermined temperature.

According to another embodiment of the present disclosure, a work vehicle is provided including a chassis that defines an engine compartment, at least one traction device supporting the chassis on the ground, an engine located in the engine compartment of the chassis, the engine operably coupled to the at least one traction device to propel the chassis across the ground, at least one hydraulic actuator that receives hydraulic fluid, and a cooling system. The cooling system includes a hydraulic cooler in fluid communication with the at least one hydraulic actuator to receive the hydraulic fluid, a fan, at least one temperature sensor, and a controller in communication with the at least one temperature sensor, the controller configured to operate the cooling system in a forward mode or a reverse mode based on an input from the at least one temperature sensor, wherein in the forward mode, the fan directs air across the hydraulic cooler in a forward direction to cool the hydraulic fluid, and in the reverse mode, the fan directs air from the engine compartment across the hydraulic cooler in a reverse direction to warm the hydraulic fluid.

According to yet another embodiment of the present disclosure, a method is provided for operating a work vehicle, the work vehicle including an engine in an engine compartment and at least one hydraulic actuator that receives hydraulic fluid. The method includes the steps of directing air from the engine compartment across the hydraulic fluid in a reverse direction to warm the hydraulic fluid, and directing ambient air across the hydraulic fluid in a forward direction to cool the hydraulic fluid.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Figure 1:
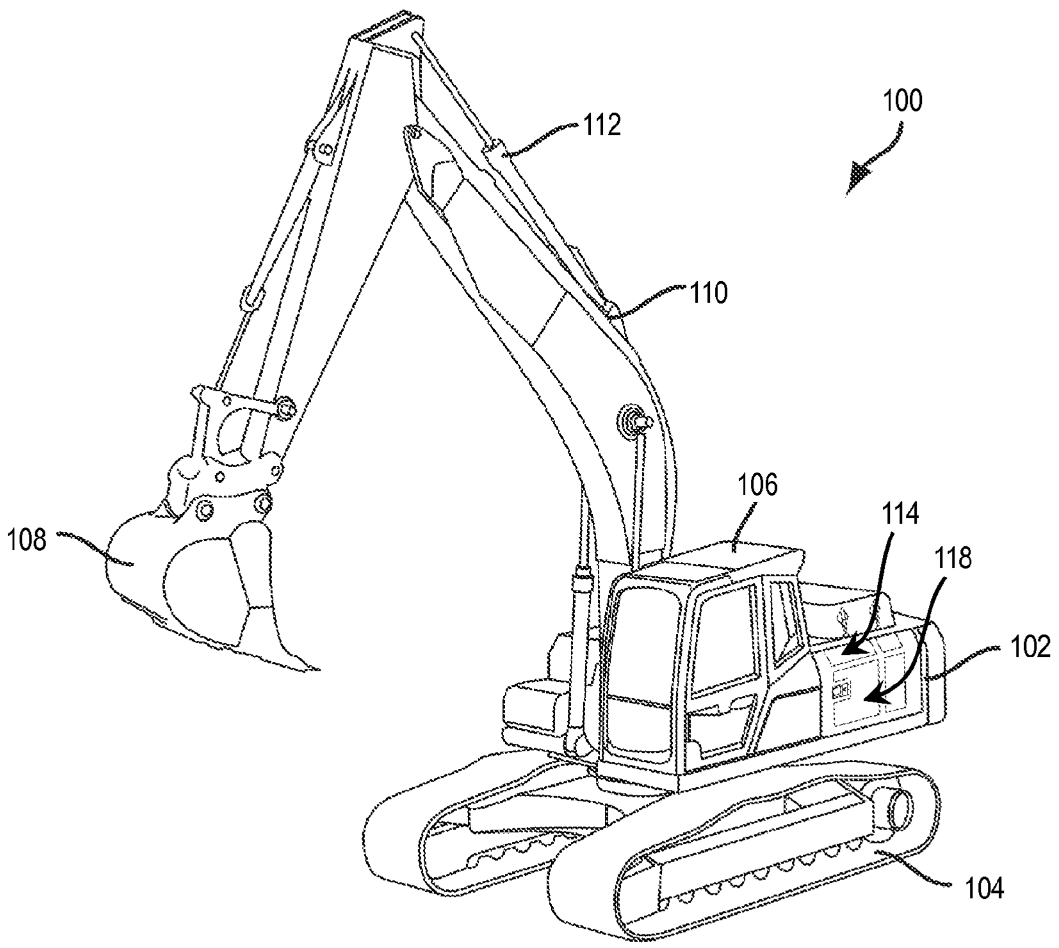
FIG. 1 is a perspective view of an exemplary excavator of the present disclosure.

Referring initially to FIG. 1, a work vehicle 100 is provided in the form of an excavator. Although vehicle 100 is illustrated and described herein as an excavator, vehicle 100 may also be in the form of a loader, a bulldozer, a motor grader, or another construction, agricultural, or utility vehicle, for example.

Figure 3:
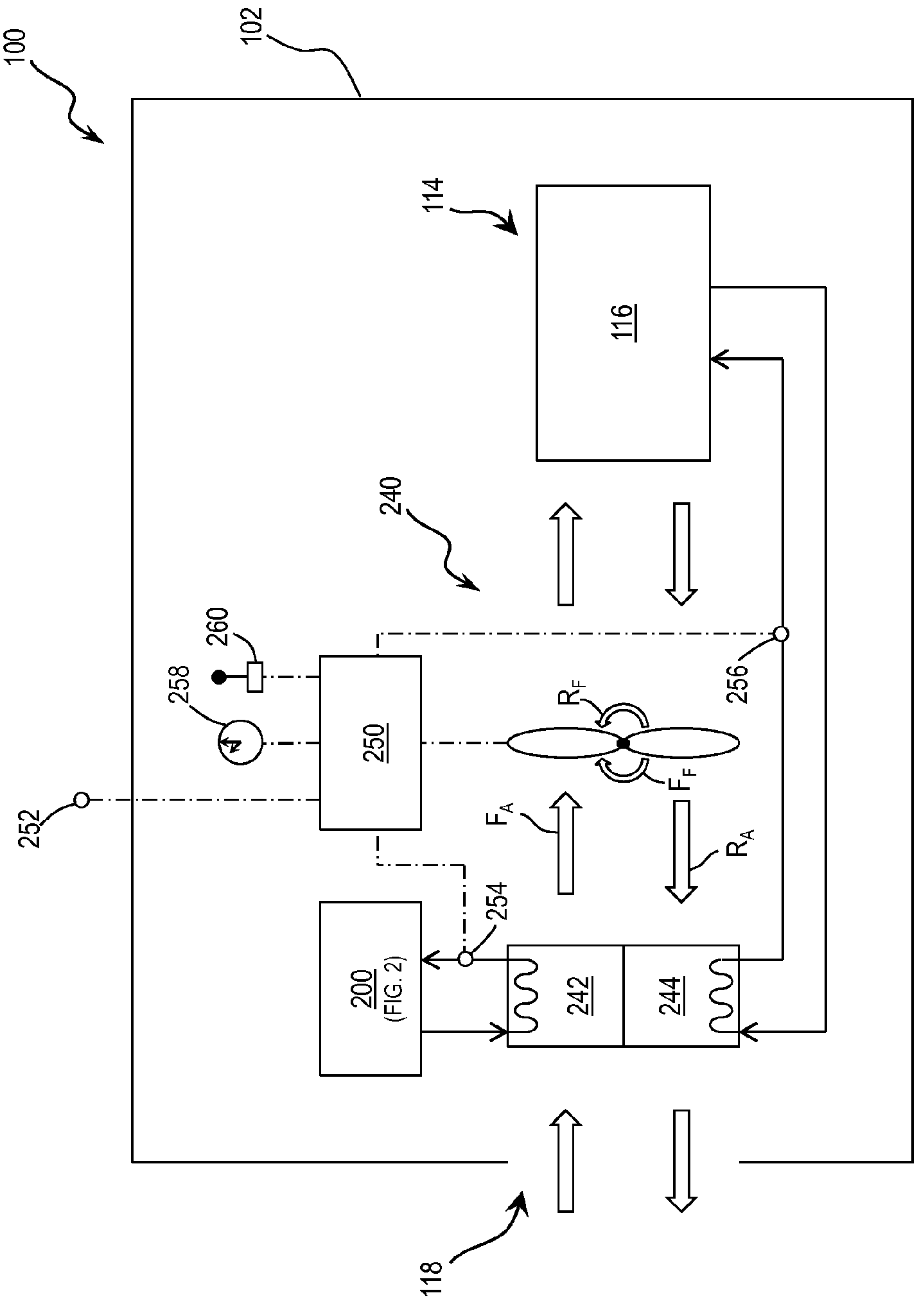
FIG. 3 is a schematic diagram of an exemplary cooling system for the excavator of FIG. 1.

Vehicle 100 includes chassis 102. At least one traction device 104, illustratively a plurality of tracks, is provided to support chassis 102 on the ground. Although fraction devices 104 are in the form of tracks in FIG. 1, it is also within the scope of the present disclosure that traction devices 104 may be in the form of wheels, for example. Chassis 102 defines an engine compartment 114 that houses and protects an engine 116 (FIG. 3). In use, engine 116 powers traction devices 104 to propel chassis 102 across the ground.

Vehicle 100 further includes an operator cab 106 supported by chassis 102 to house and protect the operator of vehicle 100. Operator cab 106 may include a seat and various controls or user inputs (e.g., a steering wheel, joysticks, levers, buttons) for operating vehicle 100.

Vehicle 100 further includes at least one work tool, illustratively a front-mounted bucket 108. Bucket 108 is moveably coupled to chassis 102 via boom assembly 110 for scooping, carrying, and dumping dirt and other materials. Other suitable work tools include, for example, blades, forks, tillers, and mowers. One or more hydraulic cylinders 112 are also provided to achieve movement of bucket 108 and/or boom assembly 110 relative to chassis 102.

Figure 2:
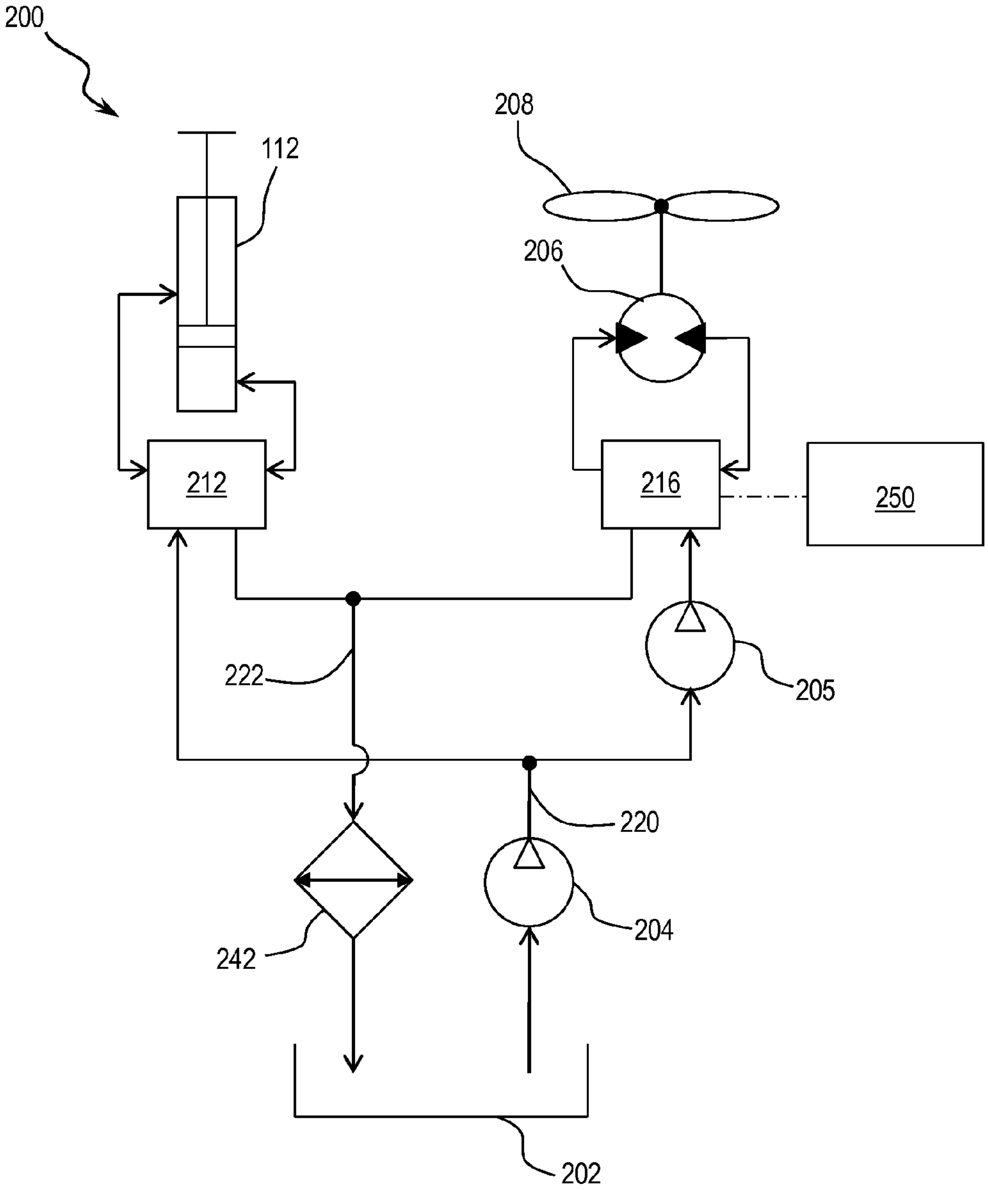
FIG. 2 provides an exemplary hydraulic circuit for operating the excavator of FIG. 1.

Referring next to FIG. 2, a hydraulic circuit 200 is provided for operating hydraulic functions of vehicle 100. The illustrative hydraulic circuit 200 of FIG. 2 includes a source or reservoir 202 of hydraulic fluid (e.g., oil), one or more pumps 204, 205, and at least one hydraulic actuator. In FIG. 2, the hydraulic actuators include hydraulic cylinder 112, which operates bucket 108 (FIG. 1), and hydraulic motor 206, which operates fan 208. Fan 208 is described further below with reference to FIG. 3. It is within the scope of the present disclosure that other hydraulic actuators may be provided to perform other hydraulic functions of vehicle 100. The illustrative hydraulic circuit 200 of FIG. 2 also includes flow control valves 212, 216, that control cylinder 112 and motor 206, respectively. The illustrative hydraulic circuit 200 of FIG. 2 further includes a first hydraulic flow path 220 from reservoir 202 to the flow control valves 212, 216, and a second, return hydraulic flow path 222 from the flow control valves 212, 216, back to reservoir 202.

Referring next to FIG. 3, a cooling system 240 is provided to cool vehicle 100. The illustrative cooling system 240 of FIG. 3 includes at least one heat exchanger or cooler (e.g., a radiator), illustratively a first, hydraulic cooler 242 and a second, engine cooler 244. The illustrative cooling system 240 of FIG. 3 also includes fan 208. The hydraulic cooler 242 of FIG. 3 may receive hydraulic fluid from the above-described hydraulic circuit 200. Returning briefly to FIG. 2, hydraulic cooler 242 is shown positioned along the return hydraulic flow path 222 of hydraulic circuit 200 to cool the hydraulic fluid from cylinder 112 and motor 206 before the hydraulic fluid returns back to reservoir 202. The engine cooler 244 of FIG. 3 may receive an engine coolant that circulates around and/or through engine 116. Coolers 242, 244, are illustratively arranged in a side-by-side configuration, but it is also within the scope of the present disclosure that coolers 242, 244, may be arranged in a stacked configuration, with one cooler 242 stacked on top of the other cooler 244, for example.

The illustrative cooling system 240 of FIG. 3 further includes a controller 250 that controls fan 208. Controller 250 may control fan 208 to maintain the hydraulic fluid within a desired temperature range by way of hydraulic cooler 242 and/or to maintain the engine coolant within a desired temperature range by way of engine cooler 244. Controller 250 may control the speed of fan 208. For example, controller 250 may operate fan 208 at a full speed (e.g., 100%), a stopped speed (e.g., 0%), and at a plurality of intermediate speeds therebetween (e.g., 1%-99%). Controller 250 may also control the direction of fan 208 to operate fan 208 in a first, forward or cooling mode or a second, reverse or warming mode. In FIG. 2, controller 250 is shown communicating with flow control valve 216 to control the operation of motor 206 and fan 208. The interaction between controller 250 and flow control valve 216 is discussed further below with reference to FIG. 4.

In the forward or cooling mode, controller 250 rotates fan 208 in a forward fan direction $F_F$ to pull cool, ambient air into chassis 102 and across coolers 242, 244 in a forward air direction $F_A$, as shown in FIG. 3. The cool, ambient air may enter chassis 102 via an opening 118 in chassis 102. As shown in FIG. 1, opening 118 is formed in a side wall of chassis 102 and may be partially covered with a protective screen or grille, for example. The screen or grille may be moveably coupled to chassis 102 to allow the operator to open the screen or grill and access fan 208, coolers 242, 244, and other components of cooling system 240. The cool, ambient air may cool the hydraulic fluid in hydraulic cooler 242 and the engine coolant in engine cooler 244. After passing across coolers 242, 244, the ambient air may continue to travel through chassis 102 in the forward air direction $F_A$ and into engine compartment 114, which may facilitate direct air cooling of engine 116.

In the reverse or warming mode, controller 250 rotates fan 208 in a reverse fan direction $R_F$ (which is opposite the forward fan direction $F_F$) to pull warm air from engine compartment 114 across coolers 242, 244 in a reverse air direction $R_A$ (which is opposite the forward air direction $F_A$), as shown in FIG. 3. The warm air from engine compartment 114 may heat the hydraulic fluid in hydraulic cooler 242 and the engine coolant in engine cooler 244. After passing across coolers 242, 244, the warm air may exit chassis 102 via opening 118 in the reverse air direction $R_A$, which may clear away dirt and debris that collected on and near opening 118 of chassis 102 during the forward mode of operation.

Controller 250 may operate fan 208 in the reverse or warming mode to warm the hydraulic fluid from a cold initial temperature to a normal operating temperature. Warming the hydraulic fluid to its normal operating temperature may improve the viscosity and performance of the hydraulic fluid. When the hydraulic fluid reaches its normal operating temperature, controller 250 may then operate fan 208 in the forward or cooling mode to cool and/or maintain the temperature of the hydraulic fluid.

For the following reasons, operating fan 208 in the reverse or warming mode may warm the hydraulic fluid faster than stopping fan 208. First, engine 116 may warm up relatively quickly, and operating fan 208 in the reverse or warming mode may take advantage of the warm air in engine compartment 114 to heat the hydraulic fluid in hydraulic cooler 242, rather than leaving this warm air stagnant in engine compartment 114. Also, operating fan 208 in the reverse or warming mode will require the hydraulic fluid to circulate through the hydraulic circuit 200 to operate motor 206 and fan 208 (FIG. 2), which will heat the hydraulic fluid faster than leaving the hydraulic fluid stagnant in reservoir 202. Thus, operating fan 208 in the reverse or warming mode promotes improved warm-up of the hydraulic fluid.

Operating fan 208 in the reverse or warming mode may temporarily sacrifice ambient cooling of engine 116. However, when the hydraulic fluid is sufficiently heated, fan 208 may return to operating in the forward or cooling mode to cool engine 116. Such cooling may occur both indirectly, by passing ambient air across the engine coolant in engine cooler 244, and directly, by passing ambient air across engine 116 itself.

In FIG. 3, the forward and reverse modes are achieved by changing the direction of rotation of fan 208. Specifically, the forward mode is achieved by rotating fan 208 in the forward fan direction $F_F$, and the reverse mode is achieved by rotating fan 208 in the reverse fan direction $R_F$. It is also within the scope of the present disclosure to achieve the forward and reverse modes by manipulating the blades of fan 208, for example, without changing the direction of rotation of fan 208. Such fans are available from Flexxaire of Alberta, Canada.

Controller 250 may control fan 208 based on temperature data from one or more temperature sensors. In FIG. 3, controller 250 communicates with a first temperature sensor 252 that measures the temperature of the ambient air around vehicle 100, a second temperature sensor 254 that measures the temperature of the hydraulic fluid in vehicle 100, and a third temperature sensor 256 that measures the temperature of the engine coolant in vehicle 100. In operation, controller 250 may receive temperature input data from one or more temperature sensors 252, 254, 256, process the temperature input data, and communicate with the flow control valve 216 of motor 206 (FIG. 2) to control the operation of fan 208 based on the processed temperature data. If temperature sensor 252 detects a low ambient air temperature (such as when operating vehicle 100 in a cold climate), for example, controller 250 may be able to reduce the speed of fan 208 in the forward or cooling mode while still achieving adequate cooling of the hydraulic fluid and the engine coolant in coolers 242, 244, respectively. However, if temperature sensors 254, 256 detect a high hydraulic fluid temperature and/or a high engine coolant temperature, controller 250 may increase the speed of fan 208 to achieve more cooling in coolers 242, 244, respectively.

Controller 250 may use such temperature data to operate fan 208 in the reverse or warming mode at low hydraulic fluid temperatures, and in the forward or cooling mode at normal or high hydraulic fluid temperatures. As discussed above, controller 250 may receive the temperature of the hydraulic fluid from temperature sensor 254. When the hydraulic fluid is below a predetermined temperature (e.g., below about 50° C.), controller 250 may operate fan 208 in the reverse or warming mode to warm the hydraulic fluid. When the hydraulic fluid reaches or exceeds the predetermined temperature (e.g., about 50° C. or more), controller 250 may switch fan 208 to the forward or cooling mode to cool or maintain the temperature of the hydraulic fluid.

Controller 250 may also control fan 208 based on time data from a timer 258, which may measure the time of operation of vehicle 100 since its last start-up, for example. In operation, controller 250 may receive time input data from timer 258, process the time input data, and communicate with the flow control valve 216 of motor 206 (FIG. 2) to control the operation of fan 208 based on the processed time data.

Controller 250 may use such time data to operate fan 208 in the reverse or warming mode during an initial start-up period of vehicle 100, and in the forward or cooling mode during subsequent operation of vehicle 100. When vehicle 100 has been turned on for less than a predetermined time (e.g., less than 1 hour, less than 2 hours), controller 250 may operate fan 208 in the reverse or warming mode to warm the hydraulic fluid. When vehicle 100 has been turned on for the predetermined time or longer (e.g., 1 hour or more, 2 hours or more), controller 250 may switch fan 208 into the forward or cooling mode to cool the hydraulic fluid.

Controller 250 may also control fan 208 based on a manual input or command from the operator of vehicle 100. In FIG. 3, controller 250 communicates with a user input device 260, which may allow the operator to power fan 208 on/off, select the speed of fan 208, and/or select the direction of fan 208, for example. In operation, controller 250 may receive a manual input from the user input device 260, process the manual input, and communicate with the flow control valve 216 of motor 206 (FIG. 2) to control the operation of fan 208 based on the processed input. The user input device 260 may be located in operator cab 106 of vehicle 100 (FIG. 1) for access and use by the operator.

It is within the scope of the present disclosure that controller 250 may control fan 208 based on a combination of temperature inputs, time inputs, and/or manual inputs. For example, controller 250 may wait a predetermined time before powering on fan 208, and then controller 250 may receive temperature data to control further operation of fan 208.

As discussed above with reference to FIG. 2, controller 250 communicates with flow control valve 216 to control the operation of motor 206 and fan 208. An exemplary flow control valve 216 is shown in more detail in FIG. 4.

Figure 4:
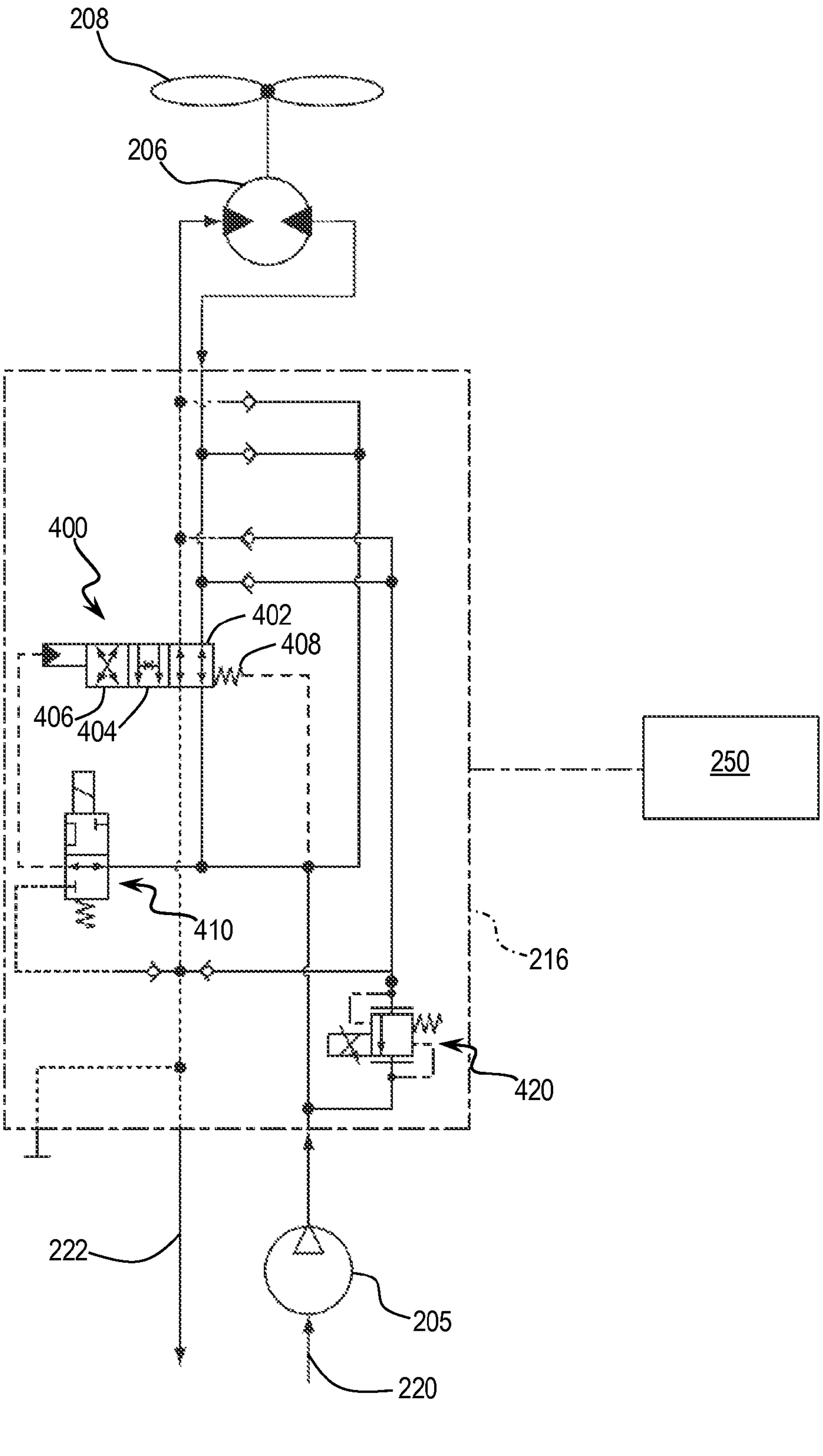
FIG. 4 shows an exemplary flow control valve for use in the hydraulic circuit of FIG. 2.

Flow control valve 216 of FIG. 4 includes a proportional, pilot-operated main valve 400 having a forward position 402, a stopped position 404, and a reverse position 406. Main valve 400 controls both the speed and the direction of fan 208. When main valve 400 is in the forward position 402, motor 206 operates fan 208 in the forward mode at a full speed (e.g., 100%). When main valve 400 is in the stopped position 404, motor 206 stops fan 208 (e.g., 0%). When main valve 400 is in the reverse position 406, motor 206 operates fan 208 in the reverse mode at full speed (e.g., 100%). Between the stopped position 404 and the forward and reverse positions 402, 406, motor 206 operates fan 208 at intermediate speeds (e.g., 1%-99%).

Flow control valve 216 of FIG. 4 also includes a solenoid-operated regulating valve 410 in communication with main valve 400. When energized, regulating valve 410 directs a fluid to main valve 400 to shift main valve 400 from its normal forward position 402 to the stopped position 404 or the reverse position 406.

Flow control valve 216 of FIG. 4 further includes a solenoid-operated restricting valve 420 in communication with main valve 400. When energized, restricting valve 420 directs pressure toward spring 408 of main valve 400 to restrict movement of main valve 400, thereby controlling the speed of fan 208 from main valve 400.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work vehicle including:

a chassis that defines an engine compartment;

at least one traction device supporting the chassis on the ground;

an engine located in the engine compartment of the chassis, the engine operably coupled to the at least one traction device to propel the chassis across the ground;

at least one hydraulic actuator that receives hydraulic fluid; and a cooling system including:

- a hydraulic cooler in fluid communication with the at least one hydraulic actuator to receive the hydraulic fluid;
- a fan having:
  - a first mode of operation, wherein the fan directs air across the hydraulic cooler in a first direction; and
  - a second mode of operation, wherein the fan directs air from the engine compartment across the hydraulic cooler in a second direction opposite the first direction; and
- a controller that operates the fan in the second mode of operation when the hydraulic fluid is below a predetermined temperature.

2. The work vehicle of claim 1, wherein the controller operates the fan in the first mode of operation when the hydraulic fluid is at or above the predetermined temperature.

3. The work vehicle of claim 1, wherein the fan rotates in opposite directions in the first and second modes of operation.

4. The work vehicle of claim 1, wherein the air that travels across the hydraulic cooler in the first direction is cooler than the air from the engine compartment that travels across the hydraulic cooler in the second direction.

5. The work vehicle of claim 1, wherein the cooling system:

cools the hydraulic fluid in the hydraulic cooler when the fan operates in the first mode of operation; and warms the hydraulic fluid in the hydraulic cooler when the fan operates in the second mode of operation.

6. A work vehicle including:

a chassis that defines an engine compartment;

at least one traction device supporting the chassis on the ground;

an engine located in the engine compartment of the chassis, the engine operably coupled to the at least one traction device to propel the chassis across the ground;

at least one hydraulic actuator that receives hydraulic fluid; and a cooling system including:

a hydraulic cooler in fluid communication with the at least one hydraulic actuator to receive the hydraulic fluid;

a fan;

at least one temperature sensor; and a controller in communication with the at least one temperature sensor, the controller configured to operate the cooling system in a forward mode or a reverse mode based on an input from the at least one temperature sensor, wherein:

in the forward mode, the fan directs air across the hydraulic cooler in a forward direction to cool the hydraulic fluid; and in the reverse mode, the fan directs air from the engine compartment across the hydraulic cooler in a reverse direction to warm the hydraulic fluid.

7. The work vehicle of claim 6, wherein the controller operates the fan:

in the reverse mode when the hydraulic fluid is below a predetermined temperature; and in the forward mode when the hydraulic fluid is at or above the predetermined temperature.

8. The work vehicle of claim 7, wherein the predetermined temperature is about 50° C.

9. The work vehicle of claim 7, wherein the engine reaches the predetermined temperature before the hydraulic fluid reaches the predetermined temperature.

10. The work vehicle of claim 6, wherein the fan rotates in opposite directions in the forward and reverse modes.

11. The work vehicle of claim 6, wherein the cooling system further includes an engine cooler that receives an engine coolant from the engine, the fan directing air across both the hydraulic cooler and the engine cooler in the forward and reverse modes.

12. The work vehicle of claim 11, wherein the at least one temperature sensor measures a temperature of one of:

ambient air outside of the chassis;

the hydraulic fluid; and the engine coolant.

13. The work vehicle of claim 11, wherein the hydraulic cooler and the engine cooler are arranged in a side-by-side configuration or a stacked configuration.

14. The work vehicle of claim 11, wherein the hydraulic cooler and the engine cooler are arranged in a side-by-side configuration.

15. The work vehicle of claim 6, wherein, in the forward mode, air from the hydraulic cooler flows into the engine compartment.

16. The work vehicle of claim 6, wherein the at least one hydraulic actuator includes a hydraulic motor that operates the fan.

17. The work vehicle of claim 6, wherein the at least one hydraulic actuator includes a hydraulic cylinder that operates a work tool.

18. A method of operating a work vehicle, the work vehicle including an engine in an engine compartment and at least one hydraulic actuator that receives hydraulic fluid, the method including the steps of:

directing air from the engine compartment across the hydraulic fluid in a reverse direction to warm the hydraulic fluid; and directing ambient air across the hydraulic fluid in a forward direction to cool the hydraulic fluid.

19. The method of claim 18, wherein:

the step of directing air in the reverse direction includes warming an engine coolant; and the step of directing air in the forward direction includes cooling the engine coolant.

20. The method of claim 18, wherein the step of directing air in the forward direction is performed after the step of directing air in the reverse direction based on at least one of:

a temperature input;

a time input; and a manual input from an operator of the work vehicle.

21. The method of claim 20, wherein the step of directing air in the reverse direction is performed when the temperature input indicates that the hydraulic fluid is below a predetermined temperature.

22. The method of claim 21, wherein the step of directing air in the forward direction is performed when the temperature input indicates that the hydraulic fluid has reached the predetermined temperature.

23. The method of claim 18, wherein:

the step of directing air in the reverse direction includes operating a fan in a reverse mode; and the step of directing air in the forward direction includes operating the fan in a forward mode.

* * * * *